No. 854,422. PATENTED MAY 21, 1907.
C. A. JANSON.
APPARATUS FOR MELTING AND PURIFYING BUTTER AND FATS.
APPLICATION FILED OCT. 5, 1905.
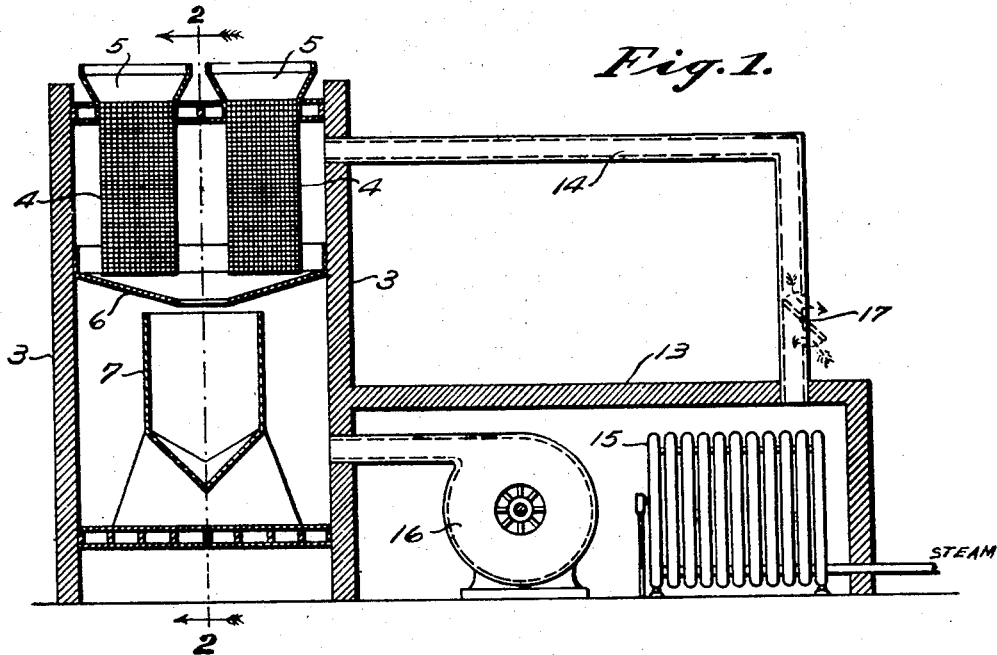
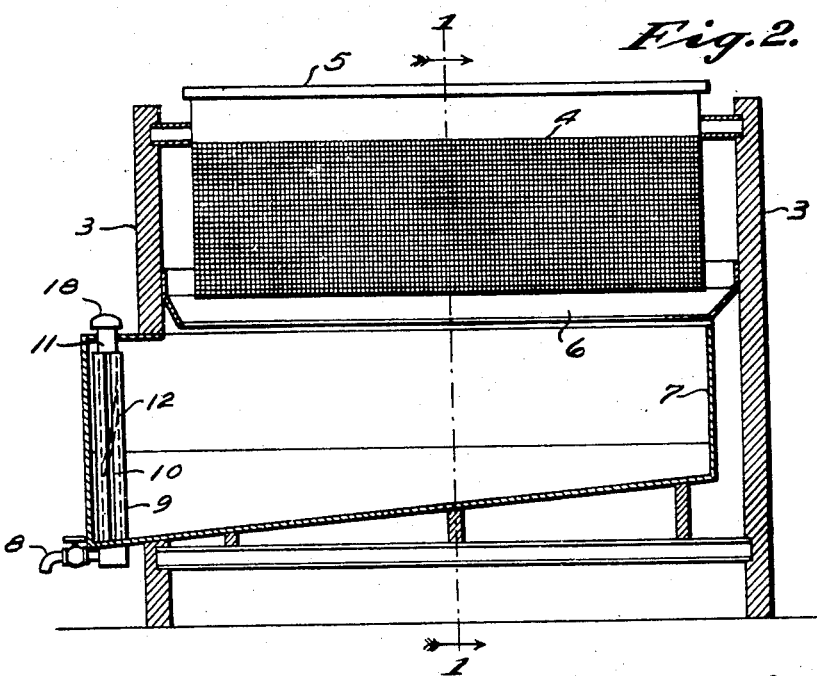

UNITED STATES PATENT OFFICE.

CARL AUGUST JANSON, OF CHICAGO, ILLINOIS.

APPARATUS FOR MELTING AND PURIFYING BUTTER AND FATS.

No. 854,422.     Specification of Letters Patent.     Patented May 21, 1907.

Application filed October 5, 1905. Serial No. 281,422.

*To all whom it may concern:*

Be it known that I, CARL AUGUST JANSON, a subject of the King of Sweden, and a resident of Chicago, in the county of Cook and State of Illinois, have invented certain new and useful Improvements in Apparatus for Melting and Purifying Butter and Fats, of which the following is a specification.

This invention relates to apparatus for melting and purifying butter, lard, tallow, and other fats by means of heated air.

The main objects of this invention are to provide improved apparatus for melting the fat by heated air and insuring that all particles of the fat are treated to the purifying action of the air; and to provide an improved form of settling tank for maintaining the fat in a molten condition and permitting liquids of different densities to be separately removed therefrom. I accomplish these objects by the device shown in the accompanying drawings, in which:

Figure 1 is a vertical section of a fat and butter purifying apparatus constructed according to my invention. Fig. 2 is a section on the line 2—2 of Fig. 1, the line 1—1 indicating the line on which the section shown in Fig. 1 is taken.

In the construction shown in the drawings, the walls 3 represent an inclosure which has secured therein at its upper part a plurality of receptacles 4 having finely perforated side walls and bottom. These receptacles are preferably formed of wire screen of fine mesh. Each of the receptacles 4 has a hopper 5 at its upper end through which the fatty matter is discharged into the receptacle 4. Immediately below the receptacle 4 is a hopper like tray 6 which collects the discharge from the receptacle 4 and delivers the same to the settling tank or reservoir 7, which is also inclosed by the walls 3 and which is provided with a discharge faucet 8 adjustable to withdraw liquid from a plurality of different levels in the tank 7. To provide for drawing off oil at different levels, I connect the faucet 8 with an outer vertically disposed pipe 9 having a longitudinal slot 10 and an inner tube 11 fitting within the tube 9 and having therein a spiral slot 12. The slots 10 and 12 intersect each other at an angle and the elevation of the point of intersection may be changed by rotating the tube 11. Since the liquid can enter the pipe 11 only at the point of intersection of the slot 10 and 12, it will be seen that the level from which liquid is withdrawn from the tank 7 may be thus controlled by the operator.

The space inclosed by the walls 3 communicates at its lower part with an air heater 13 which also communicates with the upper part of said inclosure by means of an air passage 14. The heater 13 is provided with heating coils 15 and blower 16 for causing air to flow from the heater into the space inclosed by the walls 3 and return through the passage 14. The passage 14 is provided with one or more gates at 17 by which the flow of air is so controlled that air may be recirculated through the system, or the impure air may be discharged and fresh air admitted.

The operation of the device shown is as follows: The fat which is to be treated is inserted into the receptacle 4 through the hoppers 5 in a solid state. The operation of the blower 16 then causes air to flow in contact with the heating coils 15 and then to be blown into the inclosure 3 where it surrounds the settling tank 7 and the melting receptacles 4. After passing through the inclosure 3 the air returns through the passage 14 to the heater or is discharged at 17 and fresh air admitted to take its place. Such of the fat in the receptacle 4 as has been exposed to the air melts and flows through the perforations, dripping upon the pan 6 from which it is delivered to the settling tank 7. Here the molten fat or oil is kept in a liquid state through the temperature of the inclosure and is allowed to settle; that is, the various liquids assume strata according to their densities, the clear oil will float at the top while water, curds, and salts will settle to the bottom. By manipulating the handle 18 the operator may draw off the upper stratum to any depth. The fat which is adjacent to the perforations in the receptacle 4, and the particles of molten fat which drip from the walls of said receptacle and from the pan 6 are brought into intimate contact with the air currents in the inclosure 3 and are thereby purified before arriving at the settling tank.

What I claim as my invention and desire to secure by Letters Patent is:

1. The combination of a closed heating chamber, means for causing heated air to circulate through said chamber, a receptacle partly inclosed by the walls of said chamber and having a part extending outward from said chamber, the part of said receptacle which is within said chamber having perforated walls and the part which is outside of the chamber being arranged to receive a charge of fatty material in a solid state, and a reservoir within the chamber for receiving the molten fat which drips from said receptacle, all arranged to permit of continuous operation while the receptacle is successively charged and recharged.

2. The combination of a closed heating chamber, means for causing heated air to circulate through said chamber, a receptacle partly inclosed by the walls of said chamber and having a part extending outward from said chamber, the part of said receptacle which is within said chamber having perforated walls and the part which is outside of the chamber being arranged to receive a charge of fatty material in a solid state, and a settling tank within the chamber for receiving the molten fat which drips from said receptacle, said settling tank having walls separate from those of the chamber and adapted to be heated by the air in the chamber.

3. The combination of a closed heating chamber, means for causing heated air to circulate through said chamber, a receptacle partly inclosed by the walls of said chamber and having a part extending outward from said chamber, the part of said receptacle which is within said chamber having perforated walls and the part which is outside of the chamber being arranged to receive a charge of fatty material in a solid state, a settling tank within the chamber for receiving the molten fat which drips from said receptacle, and adjustable means operated from the outside of said chamber for drawing off the upper portion of the contents of said settling tank to any desired level, without disturbing the portion of the contents below such level.

Signed at Chicago this 2nd day of October 1905.

CARL AUGUST JANSON.

Witnesses:
EUGENE A. RUMMLER,
GLEN C. STEPHENS.